(12) United States Patent
Kim et al.

(10) Patent No.: US 10,393,945 B2
(45) Date of Patent: Aug. 27, 2019

(54) DIRECTIONAL BACKLIGHT UNIT AND IMAGE DISPLAY APPARATUS INCLUDING THE SAME

(71) Applicant: SAMSUNG ELECTRONICS CO., LTD., Suwon-si (KR)

(72) Inventors: Dongouk Kim, Pyeongtaek-si (KR); Joonyong Park, Suwon-si (KR); Jaeseung Chung, Suwon-si (KR); Alexander V. Morozov, Moscow area (RU); Bongsu Shin, Seoul (KR); Jihyun Bae, Seoul (KR); Seokho Song, Seoul (KR); Dongsik Shim, Hwaseong-si (KR); Sunghoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/860,202

(22) Filed: Jan. 2, 2018

(65) Prior Publication Data

US 2018/0188439 A1 Jul. 5, 2018

(30) Foreign Application Priority Data

Jan. 2, 2017 (KR) ........................ 10-2017-0000342

(51) Int. Cl.
*F21V 7/04* (2006.01)
*F21V 8/00* (2006.01)

(52) U.S. Cl.
CPC .......... *G02B 6/0038* (2013.01); *G02B 6/0061* (2013.01); *G02B 6/0055* (2013.01); *G02B 6/0068* (2013.01)

(58) Field of Classification Search
CPC ... G02B 6/0038; G02B 6/0055; G02B 6/0068
See application file for complete search history.

(56) References Cited

U.S. PATENT DOCUMENTS 6,853,418 B2  2/2005  Suzuki et al.
7,253,799 B2  8/2007  Lee et al.
(Continued)

FOREIGN PATENT DOCUMENTS

EP  1734401 A1 * 12/2006  ........... G02B 6/0038
JP  2003-255338 A   9/2003
(Continued)

OTHER PUBLICATIONS

David Fattal et al., "A multi-directional backlight for a wide-angle, glasses-free three-dimensional display", Letter, Nature, vol. 495, Mar. 21, 2013, Macmillan Publishers Limited (pp. 348-351), doi:10.1038/nature11972.

*Primary Examiner* — Ali Alavi
(74) *Attorney, Agent, or Firm* — Sughrue Mion, PLLC

(57) ABSTRACT

Provided are a directional backlight unit and an image display apparatus including the same. The directional backlight unit includes at least one light source, a light guide plate arranged at a side of the at least one light source and configured to guide light emitted from the at least one light source by total reflection, a plurality of diffraction gratings arranged in a pattern at a surface of the light guide plate and configured to diffract the light and to emit the light diffracted by the plurality of diffraction gratings at a predetermined angle from a front surface; and a mirror arranged at a rear surface of the light guide plate and configured to reflect the light diffracted by the plurality of diffraction gratings toward the light guide plate, the rear surface of the light guide plate being opposite to the front surface of the light guide plate.

12 Claims, 13 Drawing Sheets

(56) References Cited

U.S. PATENT DOCUMENTS

| | | | |
|---|---|---|---|
| 8,427,603 B2 | 4/2013 | Ishikawa et al. | |
| 9,146,419 B1* | 9/2015 | Anandan | G02B 6/0035 |
| 2005/0041174 A1* | 2/2005 | Numata | G02B 6/0053 |
| | | | 349/61 |
| 2006/0115213 A1* | 6/2006 | Maeda | G02B 6/0016 |
| | | | 385/31 |
| 2009/0129116 A1 | 5/2009 | Kim et al. | |
| 2010/0238529 A1* | 9/2010 | Sampsell | G02B 5/32 |
| | | | 359/15 |
| 2011/0051041 A1* | 3/2011 | Yashiro | G02B 6/0061 |
| | | | 349/62 |
| 2011/0090427 A1* | 4/2011 | Ohue | G02B 6/0038 |
| | | | 349/65 |
| 2012/0162732 A1* | 6/2012 | Hong | G02B 26/0841 |
| | | | 359/9 |
| 2014/0022818 A1* | 1/2014 | Natsumeda | H04N 9/315 |
| | | | 362/607 |
| 2014/0084325 A1* | 3/2014 | Yamanaka | G02F 2/02 |
| | | | 257/98 |
| 2014/0152177 A1* | 6/2014 | Matsuda | F21K 9/90 |
| | | | 315/32 |
| 2014/0293759 A1 | 10/2014 | Taff et al. | |
| 2014/0300840 A1 | 10/2014 | Fattal et al. | |
| 2017/0248747 A1* | 8/2017 | Kim | G02B 6/005 |
| 2018/0188441 A1* | 7/2018 | Fattal | G02B 6/0038 |
| 2018/0246330 A1* | 8/2018 | Fattal | G02B 27/0172 |

FOREIGN PATENT DOCUMENTS

| | | |
|---|---|---|
| JP | 2009-123553 A | 6/2009 |
| JP | 2011-146176 A | 7/2011 |
| KR | 2003-0004021 A | 1/2003 |

\* cited by examiner

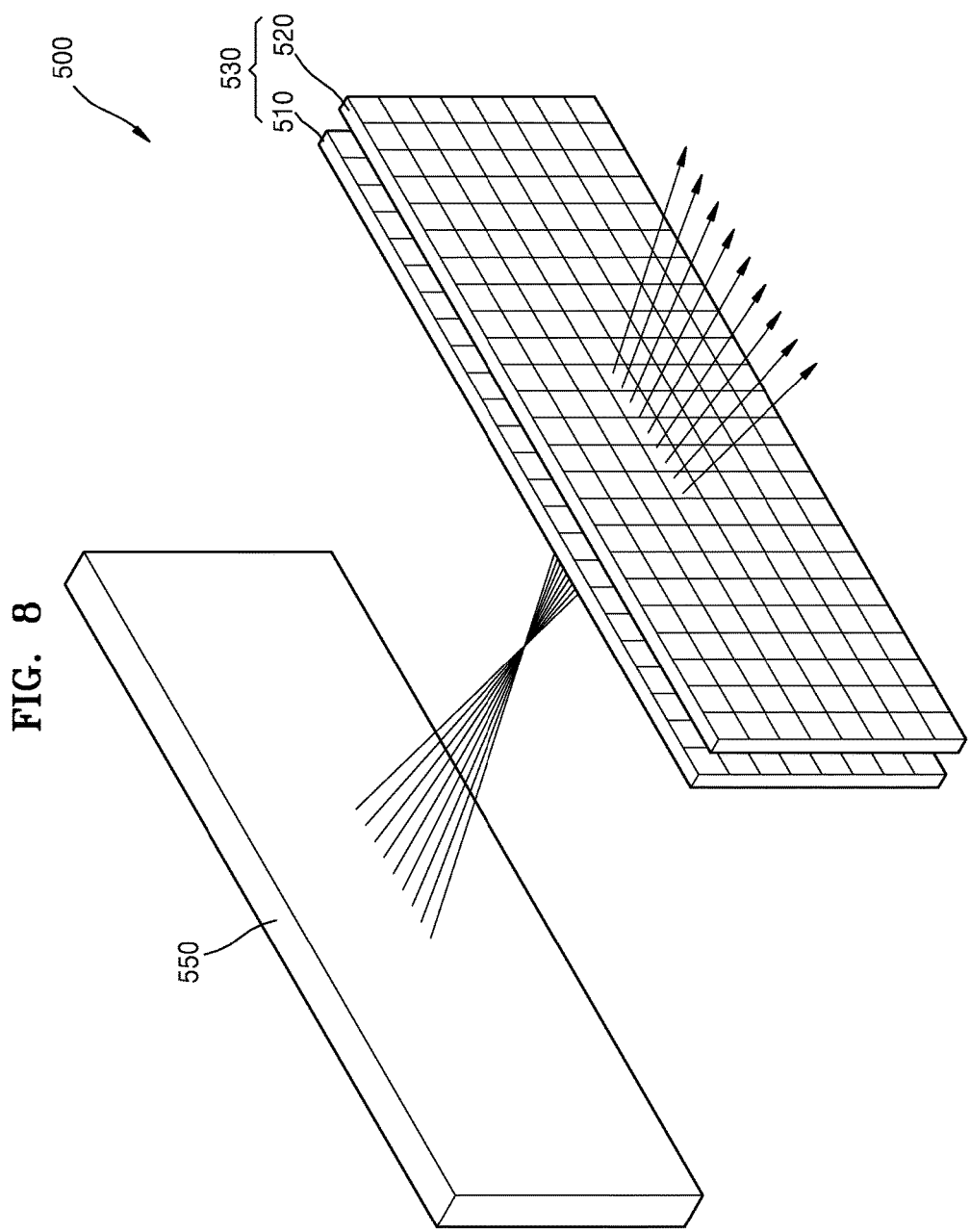

DIRECTIONAL BACKLIGHT UNIT AND IMAGE DISPLAY APPARATUS INCLUDING THE SAME

CROSS-REFERENCE TO RELATED APPLICATION

This application claims the priority from Korean Patent Application No. 10-2017-0000342, filed on Jan. 2, 2017 in the Korean Intellectual Property Office, the disclosure of which is incorporated herein in its entirety by reference.

BACKGROUND

1. Field

Example embodiments of the present disclosure relate to a directional backlight unit with improved optical efficiency and optical uniformity, and an image display apparatus including the directional backlight unit.

2. Description of the Related Art

In order to overcome limits of conventional image display apparatuses which are capable of displaying only two-dimensional (2D) images with no depth information, technologies related to three-dimensional (3D) image display apparatuses have been continually developed. Types of 3D image display apparatuses currently being commercialized include those using binocular parallax, whereby an image for a left eye and an image for a right eye, which have different points of sight, are provided to a left eye and a right eye of a user, respectively, to allow the user experience a 3D effect. These 3D image display apparatuses include glasses-type 3D image display apparatuses that require specific glasses and non-glasses-type 3D image display apparatuses that do not require glasses.

Among the glasses-type 3D image display apparatuses, a red-green glasses-type 3D image display apparatus may be used for a theater and a polarized light glasses-type 3D image display apparatus or a liquid crystal shutter-type 3D image display apparatus may be used for a television (TV). The non-glasses-type 3D image display apparatuses may include a barrier-type 3D image display apparatus, a lenticular-type 3D image display apparatus, etc., and may include a multi-view rendering-type 3D image display apparatus, a volumetric-type 3D image display apparatus that contains all information of a 3D space and displays the information in a 3D space via voxels, an integral imaging-type 3D image display apparatus that photographs an image at various angles, the image formed via a lens having a shape of compound eye of an insect (a fly eye), and reversely displays the photographed image, a holographic-type 3D image display apparatus, etc., based on a method of realizing an image.

The non-glasses-type 3D image display apparatuses using a directional backlight unit may use a diffraction grating having a pitch having a size in the range of, for example, hundreds of nanometers, and may realize a 3D image by selecting one of the above-described image realization methods and set a direction of a light output as necessary.

SUMMARY

One or more example embodiments provide a directional backlight unit with improved optical efficiency and optical uniformity.

One or more example embodiments also provide an image display apparatus including a directional backlight unit with improved optical efficiency and optical uniformity.

According to an aspect of an example embodiment, there is provided a directional backlight unit including at least one light source, a light guide plate arranged at a side of the at least one light source, and configured to guide light emitted from the at least one light source by total reflection, a plurality of diffraction gratings arranged in a pattern at a surface of the light guide plate and configured to diffract the light emitted from the light source and to emit the light diffracted by the plurality of diffraction gratings at a predetermined angle from a front surface of the light guide plate, and a mirror arranged at a rear surface of the light guide plate and configured to reflect the light diffracted by the plurality of diffraction gratings toward the light guide plate, the rear surface of the light guide plate being opposite to the front surface of the light guide plate.

The plurality of diffraction gratings may be arranged at the front surface of the light guide plate.

The plurality of diffraction gratings may be arranged at the rear surface of the light guide plate.

The mirror may be arranged over a total area of the rear surface of the light guide plate.

The directional backlight unit of claim 1, wherein the mirror is arranged over a portion of the rear surface of the light guide plate.

The at least one light source may include at least one from among a red light source, a green light source, and a blue light source.

The mirror may include a dichroic mirror.

The dichroic mirror may include at least one from among a red dichroic mirror configured to reflect only red light, a green dichroic mirror configured to reflect only green light, and a blue dichroic mirror configured to reflect only blue light.

The dichroic mirror may be arranged over a portion of the rear surface of the light guide plate.

The red dichroic mirror may be arranged at a side of the rear surface of the light guide plate opposite to the red light source, the green dichroic mirror may be arranged at a side of the rear surface of the light guide plate opposite to the green light source, and the blue dichroic mirror may be arranged at a side of the rear surface of the light guide plate opposite to the blue light source.

According to an aspect of another example embodiment, there is provided an image display apparatus including at least one light source, a light guide plate arranged at a side of the light source, and configured to guide light emitted from the at least one light source by total reflection, a plurality of diffraction gratings arranged in a pattern at a surface of the light guide plate and configured to diffract the light emitted from the at least one light source and to emit the light diffracted by the plurality of diffraction gratings at a predetermined angle from a front surface of the light guide plate, a mirror arranged at a rear surface of the light guide plate and configured to reflect the light diffracted by the plurality of diffraction gratings toward the light guide plate, the rear surface of the light guide plate being opposite to the front surface of the light guide plate, and a display panel arranged on the front surface of the light guide plate.

The plurality of diffraction gratings may be arranged at the front surface of the light guide plate.

The plurality of diffraction gratings may be arranged at the rear surface of the light guide plate.

The mirror may be arranged over a total area of the rear surface of the light guide plate.

The mirror may be arranged over a portion of the rear surface of the light guide plate.

The at least one light source may include at least one of a red light source, a green light source, and a blue light source.

The mirror may include a dichroic mirror.

The dichroic mirror may include at least one of a red dichroic mirror configured to reflect only red light, a green dichroic mirror configured to reflect only green light, and a blue dichroic mirror configured to reflect only blue light.

The dichroic mirror may be arranged over a portion of the rear surface of the light guide plate.

The red dichroic mirror may be arranged at a side of the rear surface of the light guide plate opposite to the red light source, the green dichroic mirror may be arranged at a side of the rear surface of the light guide plate opposite to the green light source, and the blue dichroic mirror may be arranged at a side of the rear surface of the light guide plate opposite to the blue light source.

BRIEF DESCRIPTION OF THE DRAWINGS

The above and/or other aspects will become apparent and more readily appreciated from the following description of example embodiments, taken in conjunction with the accompanying drawings in which:

FIG. 8 is a perspective view of an image display apparatus according to an example embodiment.

DETAILED DESCRIPTION

Figure 1:
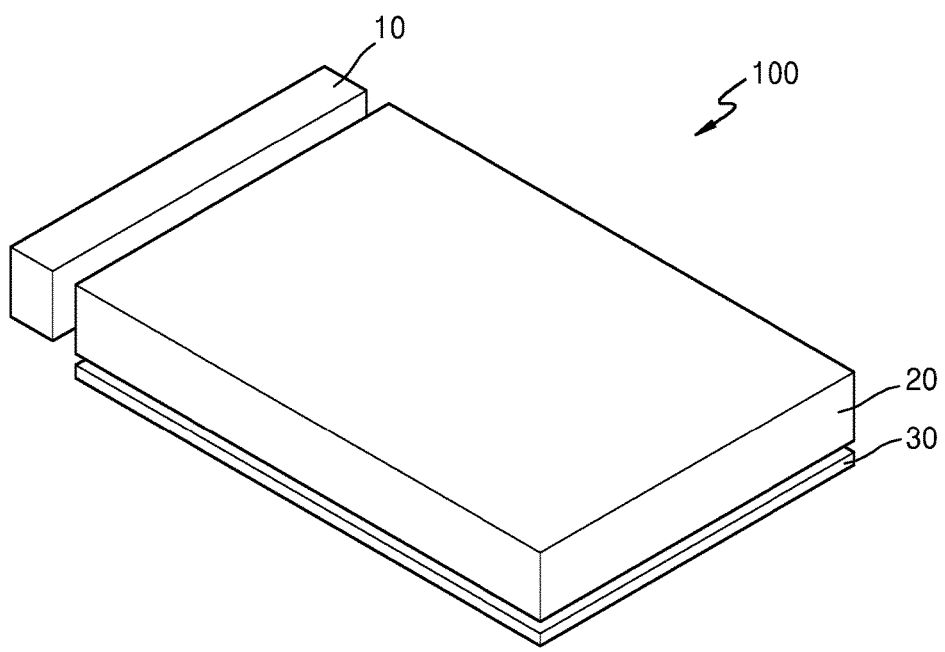
FIG. 1 is a schematic perspective view of a structure of a directional backlight unit according to an example embodiment.

Hereinafter, example embodiments will be described in detail with reference to the accompanying drawings, wherein like reference numerals refer to like elements throughout. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements. It will be also understood that the singular forms "a," "an," and "the" include plural referents unless the context clearly dictates otherwise.

Also, terms such as "front surface" and "rear surface" and the like, which are used in the following description are defined based on example embodiments as shown in the drawings, but a shape and a position of each component are not limited thereto.

FIG. 1 is a perspective view of a structure of a directional backlight unit 100 according to an example embodiment.

Referring to FIG. 1, the directional backlight unit 100 according to the example embodiment may include at least one light source 10, a light guide plate 20, a plurality of diffraction gratings 40 (FIG. 2A), and a mirror 30.

The at least one light source 10 may include a point light source, such as a light-emitting diode (LED), or a line light source, such as a cold-cathode fluorescent lamp (CCFL), but example embodiments are not limited thereto. The light source 10 may emit red light, green light, blue light, or white light.

The light guide plate 20 may include at least one incident surface via which light is incident, and an exit surface via which light is emitted after propagating through the light guide plate 20. The exit surface of the light guide plate 20 may be a front surface 21 of the light guide plate 20. The light guide plate 20 may guide the light emitted from the light source 10 via total internal reflection, and emit the light via the front surface 21 of the light guide plate 20. A surface of the light guide plate 20, which is opposite to the exit surface, the front surface 21, of the light guide plate 20, is a rear surface 22 of the light guide plate 20. While light propagates through the light guide plate 20, the front surface 21 and the rear surface 22 of the light guide plate 20 may perform total reflection of light that is not emitted and is reflected via the plurality of diffraction gratings 40 arranged at a surface of the light guide plate 20. The light source 10 may be arranged at an edge of the light guide plate 20, and light emitted from the light source 10 may be propagated to the front surface 21 and the rear surface 22 of the light guide plate 20 a plurality of times via total reflection in the light guide plate 20.

FIG. 1 illustrates that the light guide plate 20 has a flat shape. However, example embodiments are not limited thereto. For example, the light guide plate 20 may have an exit surface having a curved shape.

The plurality of diffraction gratings 40 may be arranged at a surface of the light guide plate 20. That is, the plurality of diffraction gratings 40 may be arranged at the front surface 21 or the rear surface 22 of the light guide plate 20. Light that is emitted from the light source 10 and propagates through the light guide plate 20 via total internal reflection may be emitted in a predetermined direction based on the plurality of diffraction gratings 40. The diffraction gratings 40 may be formed to have a shape in which a grating G (FIG. 4) protruding from the front surface 21 or the rear surface 22 of the light guide plate 20 may be repetitively arranged according to a predetermined rule. The diffraction gratings 40 may include the same material as the light guide plate 20, but is not limited thereto. At least two of the plurality of diffraction gratings 40 may have different pattern shapes. For example, the at least two diffraction gratings 40 may have at least one of different grating directions, cycles, heights, widths, and duty ratios. Based on a pattern shape of the diffraction gratings 40, light emitted from the diffraction gratings 40 may have different propagation directions. Each of the diffraction gratings 40 may be provided to emit light toward different visual fields.

The mirror 30 may be arranged at the rear surface 22 of the light guide plate 20. The mirror 30 may reflect light diffracted by the diffraction gratings 40 to return the light to the light guide plate 20. The mirror 30 may be arranged over the entire surface of the light guide plate 20 or only over a portion of the light guide plate 20.

Figure 2A:
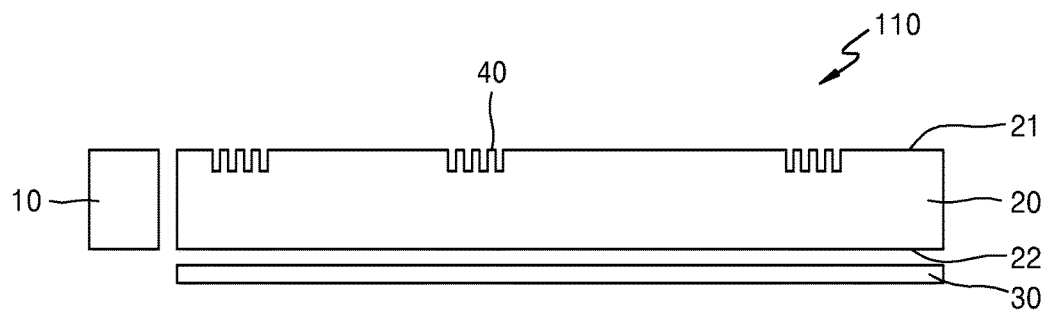
FIG. 2A is a cross-sectional view of a directional backlight unit according to an example embodiment and FIG. 2B is a cross-sectional view showing an example path in which light is propagated and emitted by a directional backlight unit according to an example embodiment.
Figure 2B:
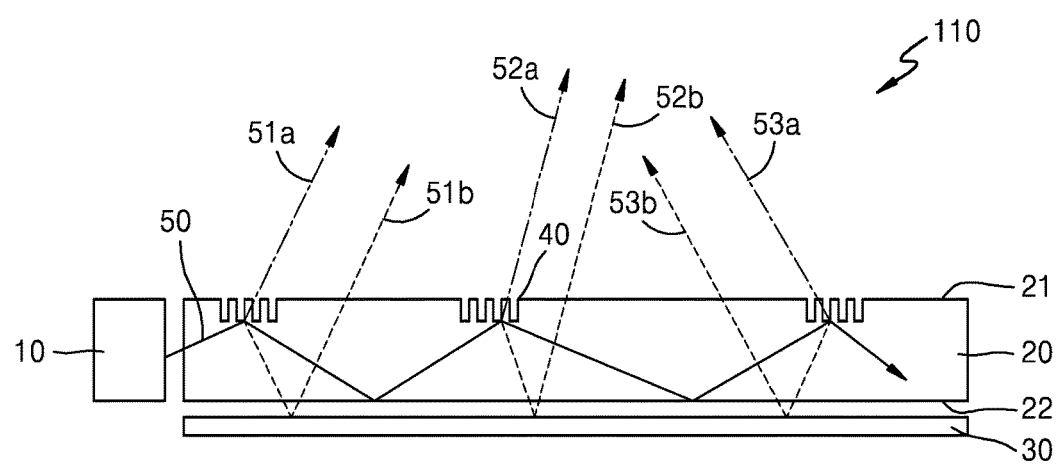

FIG. 2A is a cross-sectional view of a directional backlight unit 110 according to an example embodiment, and FIG. 2B is a cross-sectional view showing an example path in which light is propagated and emitted by the directional backlight unit 110.

Referring to FIG. 2A and FIG. 2B, the plurality of diffraction gratings 40 may be arranged at the exit surface, the front surface 21, of the light guide plate 20.

Light 50 emitted from the light source 10 may be incident into the light guide plate 20. The incident light 50 may be diffracted into first lights 51a, 52a, and 53a and second lights 51b, 52b, and 53b by the diffraction gratings 40, and the incident light 50 may propagate into the light guide plate 20 via total reflection. When the light 50 is diffracted by the diffraction gratings 40, light that has the same light amount as the diffracted light may be generated on the opposite side, as a mirror image. For example, first diffracted light of the incident light 50 may be the first lights 51a, 52a, and 53a and negative first diffracted light of the incident light 50 may be the second lights 51b, 52b, and 53b.

The first lights 51a, 52a, and 53a may be emitted in a predetermined direction by passing through the front surface 21 of the light guide plate 20, and the second lights 51b, 52b, and 53b may propagate to the rear surface 22 of the light guide plate 20. The second lights 51b, 52b, and 53b may not satisfy an angle for total reflection at the rear surface 22 of the light guide plate 20, and thus, after passing through the rear surface 22 of the light guide plate 20, may be reflected by the mirror 30, and be incident again into the light guide plate 20. The second lights 51b, 52b, and 53b that are reflected by the mirror 30 and re-incident into the light guide plate 20 may be emitted from the light guide plate 20 in the same direction as the first lights 51a, 52a, and 53a according to the principle of refraction and reflection of light. As described above, the light that is diffracted and emitted through the rear surface 22 of the light guide plate 20, among the incident light 50, may be reflected and used again, and thus, light output efficiency of the directional backlight unit 110 may be increased.

Figure 3A:
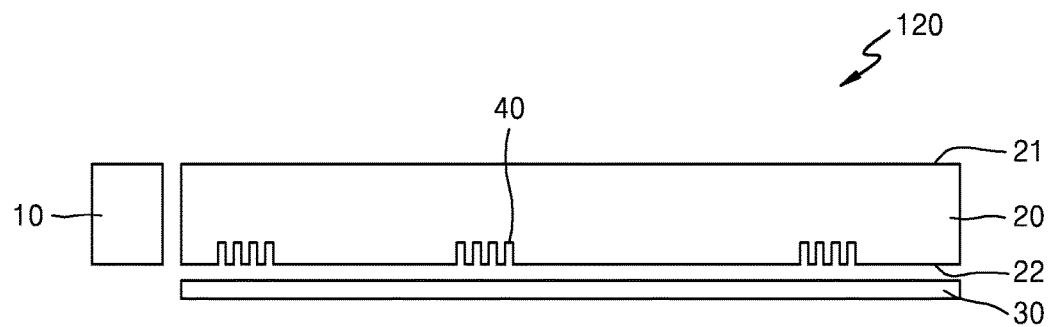
FIG. 3A is a cross-sectional view of a directional backlight unit according to an example embodiment and FIG. 3B is a cross-sectional view showing an example path in which light is propagated and emitted by a directional backlight unit according to an example embodiment.
Figure 3B:
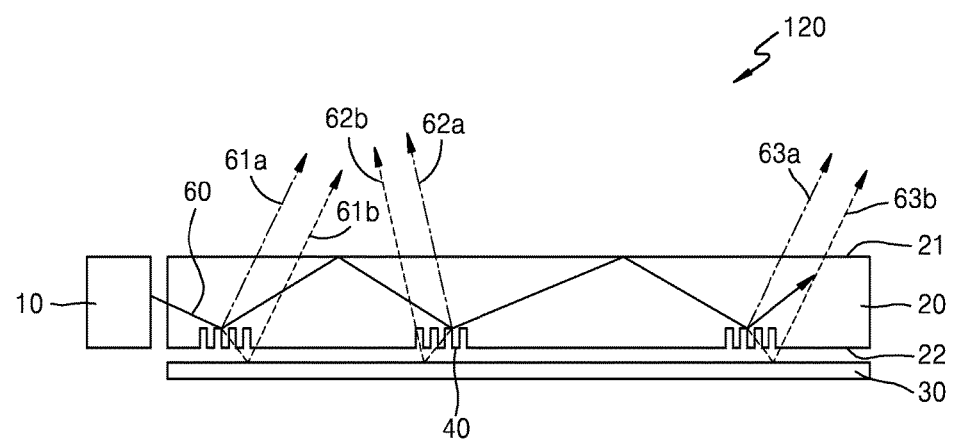

FIG. 3A is a cross-sectional view of a directional backlight unit 120 according to an example embodiment and FIG. 3B is a cross-sectional view showing an example path in which light is propagated and emitted by the directional backlight unit 120.

Referring to FIG. 3A and FIG. 3B, the plurality of diffraction gratings 40 may be arranged at the rear surface 22 of the light guide plate 20.

Light 60 that is emitted from the light source 10 may be incident into the light guide plate 20. The incident light 60 may be diffracted into first lights 61a, 62a, and 63a and second lights 61b, 62b, and 63b by the diffraction gratings 40, and the incident light 60 may propagate into the light guide plate 20 via total reflection. When the light 60 is diffracted by the diffraction gratings 40, light that has the same light amount as the diffracted light may be generated on the opposite side, as a mirror image. That is, first diffracted light of the incident light 60 may be the first lights 61a, 62a, and 63a and negative first diffracted light of the incident light 60 may be the second lights 61b, 62b, and 63b.

After being diffracted by the diffraction gratings 40, the first lights 61a, 62a, and 63a may be emitted in a predetermined direction by passing through the front surface 21 of the light guide plate 20, and the second lights 61b, 62b, and 63b may be emitted through the rear surface 22 of the light guide plate 20 and then reflected by the mirror 30 to be re-incident to the light guide plate 20. The second lights 61b, 62b, and 63b that are reflected by the mirror 30 to be re-incident into the light guide plate 20 may be emitted from the light guide plate 20 in the same direction as the first lights 61a, 62a, and 63a according to the principle of refraction and reflection of light.

In the directional backlight unit 120 according to an example embodiment, the plurality of diffraction gratings 40 may be arranged at the rear surface 22 of the light guide plate 20, and thus, a path difference between the first lights 61a, 62a, and 63a and the second lights 61b, 62b, and 63b may be reduced. When there is a path difference between the first lights 61a, 62a, and 63a and the second lights 61b, 62b, and 63b, light diffracted by a diffraction grating may be incident not only into a color filter corresponding to the diffraction grating but also into another color filter, and thus, crosstalk may occur. The directional backlight unit 120 according to an example embodiment may reduce the path difference between the first lights 61a, 62a, and 63a and the second lights 61b, 62b, and 63b, thereby reducing or suppressing the occurrence of the crosstalk.

Also, the light that is diffracted and emitted through the rear surface 22 of the light guide plate 20, among the incident light 60, may be reflected and used again, and thus, the light output efficiency of the directional backlight unit 120 may be increased.

Figure 4:
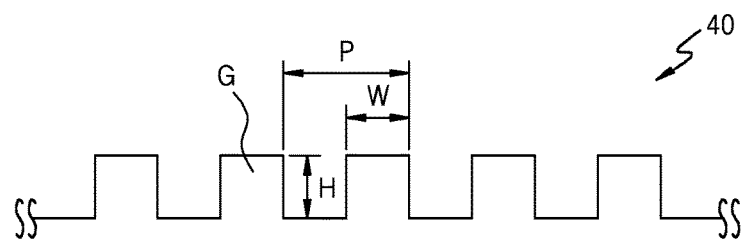
FIG. 4 is a cross-sectional view showing a portion of a diffraction grating according to an example embodiment.

FIG. 4 is a cross-sectional view showing a portion of the diffraction gratings 40 according to an example embodiment.

A shape characteristic of the diffraction gratings 40 may be indicated by a pitch P indicating a cycle in which the grating G is repeated, and a width W of the grating G. A duty ratio of the diffraction gratings 40 may be indicated by a ratio of the width W of the grating G to the pitch P between the gratings G.

Figure 5A:
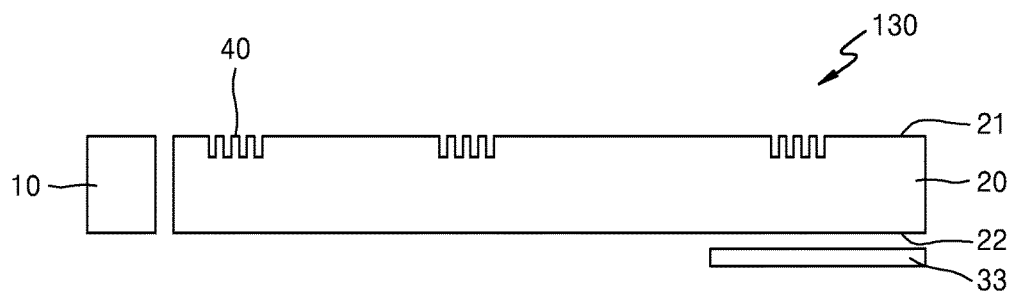
FIG. 5A is a cross-sectional view of a directional backlight unit according to an example embodiment and FIG. 5B is a cross-sectional view schematically showing an example path in which light is emitted by a directional backlight unit according to an example embodiment.
Figure 5B:
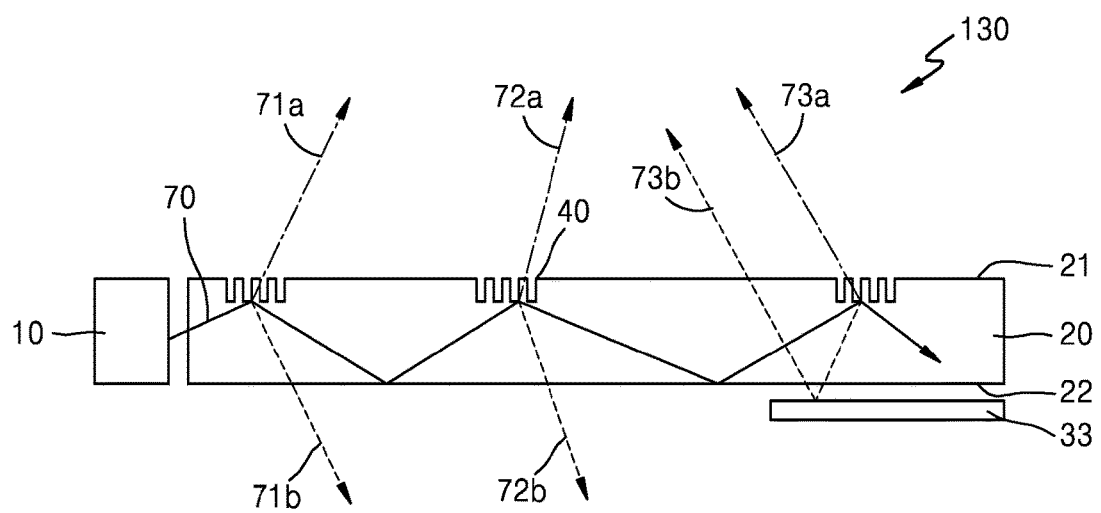

FIG. 5A is a cross-sectional view of a directional backlight unit 130 according to an example embodiment, and FIG. 5B is a cross-sectional view showing an example path in which light is propagated and emitted by the directional backlight unit 130.

Referring to FIG. 5A and FIG. 5B, a mirror 33 of the directional backlight unit 130 may be arranged at the rear surface 22 of the light guide plate 20 and may be arranged only over a portion of the light guide plate 20. Also, the mirror 33 may be arranged at a side of the light guide plate 20 opposite to the side of the light guide plate in which the light source 10 is arranged.

Light 70 emitted from the light source 10 may be incident into the light guide plate 20. The incident light 70 may be diffracted into first lights 71a, 72a, and 73a and second lights 71b, 72b, and 73b by the diffraction gratings 40, and the incident light 70 may propagate into the light guide plate 20 via total reflection. First diffracted light of the incident light 70 may be the first lights 71a, 72a, and 73a and negative first diffracted light of the incident light 70 may be the second lights 71b, 72b, and 73b.

The first lights 71a, 72a, and 73a may be emitted in a predetermined direction by passing through the front surface 21 of the light guide plate 20, and the second lights 71b, 72b, and 73b may propagate toward the rear surface 22 of the light guide plate 20. The second lights 71b, 72b, and 73b may not satisfy an angle for total reflection at the rear surface 22 of the light guide plate 20, and thus, may pass through the rear surface 22 of the light guide plate 20. From among the second lights 71b, 72b, and 73b that have passed through the rear surface 22 of the light guide plate 20, the second lights 71b and 72b emitted through a portion of the rear surface 22 of the light guide plate 20, at which the mirror 33 is not arranged, may be emitted to the outside, and the second light 73b emitted to a portion at which the mirror 33 is arranged may be reflected by the mirror 33 to be re-incident to the light guide plate 20. The second light 73b that is reflected by the mirror 33 to be re-incident to the light guide plate 20 may be emitted from the light guide plate 20 in the same direction as the first light 73a according to the principle of refraction and reflection of light.

Since the light emitted from the light source 10 may be emitted to the outside of the light guide plate 20 via the diffraction gratings 40 at a certain rate, the amount of light may be continuously reduced toward the back of the light propagating direction. In the directional backlight unit 130 according to an example embodiment, the mirror 33 may be arranged only at a side of the light guide plate 20 in the light propagation direction opposite to the light source 10, so that the light that is emitted through the rear surface 22 of the light guide plate 20 is reflected and re-used. Thus, optical uniformity of the light emitted from the directional backlight unit 130 may be increased.

Figure 6:
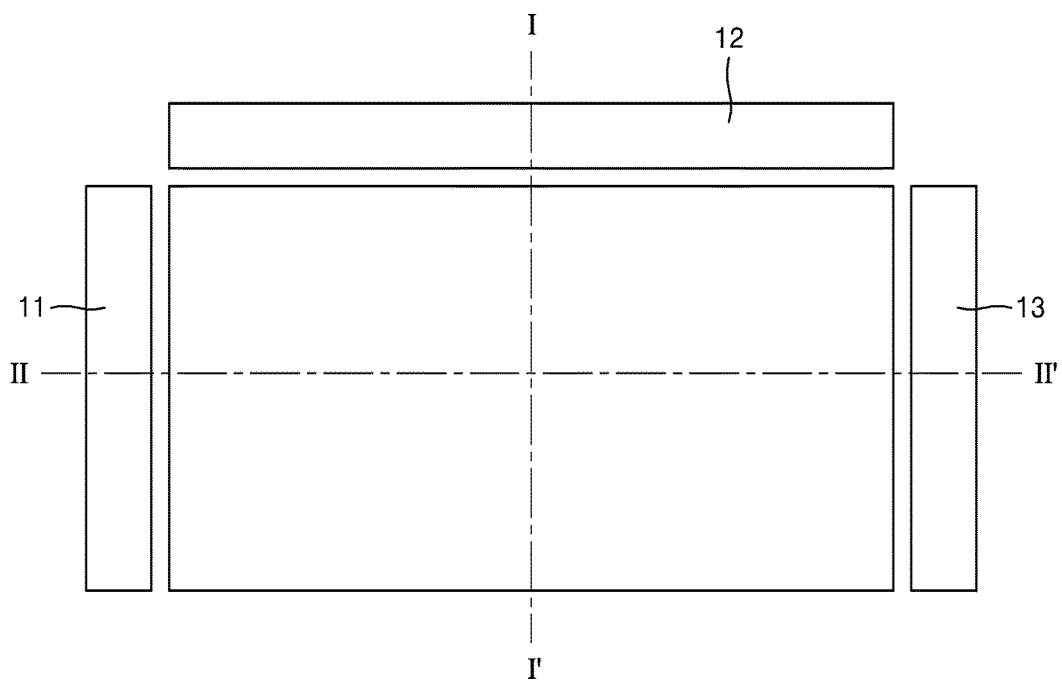
FIG. 6 is a plan view of a structure of a directional backlight unit according to an example embodiment.

FIG. 6 is a plan view of a structure of a directional backlight unit 200 according to an example embodiment.

Referring to FIG. 6, the directional backlight unit 200 may include a first light source 11 irradiating light of a first wavelength range, a second light source 12 irradiating light of a second wavelength range, and a third light source 13 irradiating light of a third wavelength range. For example, the first light source 11 may emit red light, the second light source 12 may emit green light, and the third light source 13 may emit blue light. The first light source 11 may be arranged at a first lateral direction of the light guide plate 20, the second light source 12 may be arranged at a second lateral direction of the light guide plate 20, and the third light source 13 may be arranged at a third lateral direction of the light guide plate 20. However, the arrangement of the light sources is not limited thereto, and the light sources may be arranged in various ways. For example, the first light source 11, the second light source 12, and the third light source 13 may be alternately arranged at a side of the light guide plate 20. Also, each color light irradiated from the first light source 11, the second light source 12, and the third light source 13 may be incident to the light guide plate 20 in a different direction.

Figure 7A:
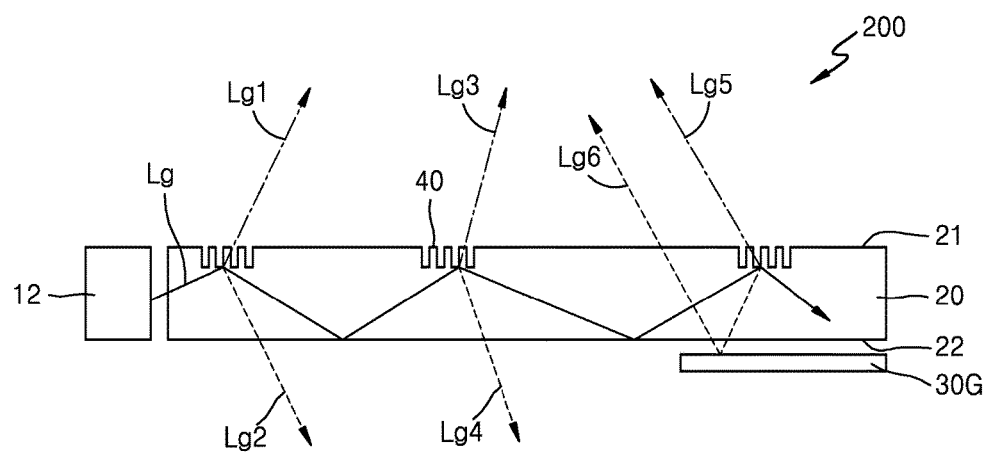
FIG. 7A is a cross-sectional view of the directional backlight unit of FIG. 6, taken along a direction I-I'.
Figure 7B:
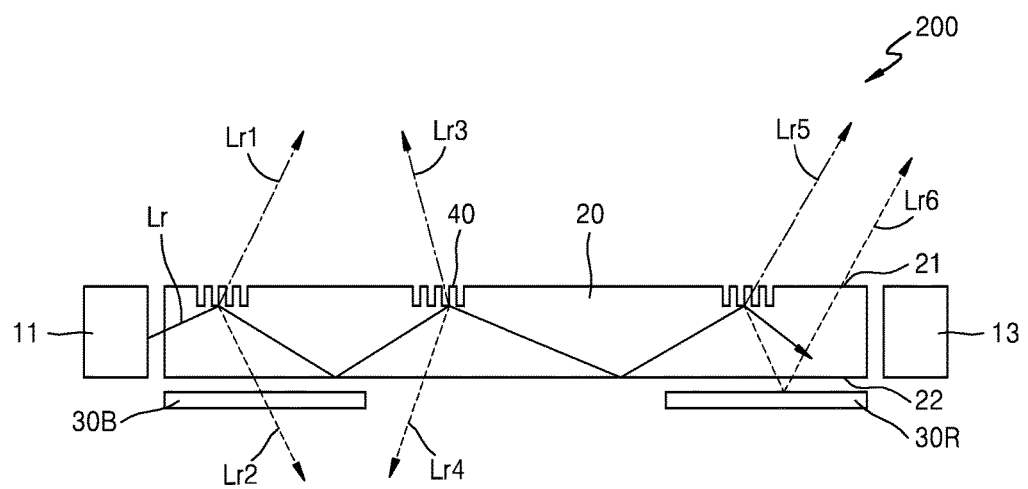
FIG. 7B and FIG. 7C are cross-sectional views of the directional backlight unit of FIG. 6, taken along a direction II-II'.
Figure 7C:
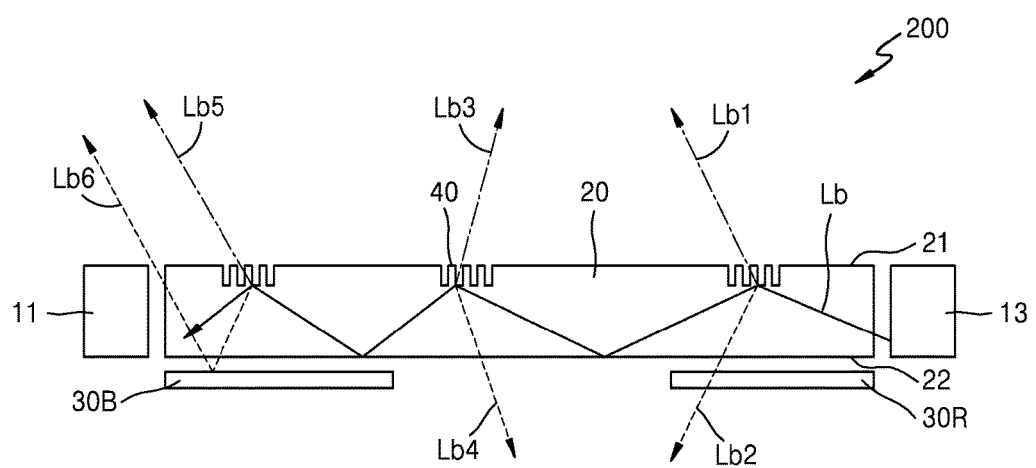

Also, the directional backlight unit 200 may include red, green, and blue dichroic mirrors 30R, 30G, and 30B (FIG. 7A, FIG. 7B, and FIG. 7C). The red, green, and blue dichroic mirrors 30R, 30G, and 30B may be reflectors including a plurality of thin layers including materials having different refractive indices, and may have characteristics of reflecting light of a specific wavelength range but allowing light of other wavelength ranges to pass through the dichroic mirrors 30R, 30G, and 30B. The red dichroic mirror 30R may reflect only red light and allow light of other wavelength ranges to pass therethrough, the green dichroic mirror 30G may reflect only green light and allow light of other wavelength ranges to pass therethrough, and the blue dichroic mirror 30B may reflect only blue light and allow light of other wavelength ranges to pass therethrough.

FIG. 7A is a cross-sectional view of the directional backlight unit 200 of FIG. 6, taken along a direction I-I'.

Referring to FIG. 7A, the green dichroic mirror 30G may be arranged only over a portion of the light guide plate 20 and at the opposite side to the second light source 12.

Green light Lg emitted from the second light source 12 may be incident into the light guide plate 20. The incident green light Lg may be diffracted into first lights Lg1, Lg3, and Lg5 and second lights Lg2, Lg4, and Lg6 by the diffraction gratings 40, and the green light Lg may propagate into the light guide plate 20 via total reflection. First diffracted light of the green light Lg may be the first lights Lg1, Lg3, and Lg5, and negative first diffracted light of the green light Lg may be the second lights Lg2, Lg4, and Lg6.

The first lights Lg1, Lg3, and Lg5 may be emitted in a predetermined direction by passing through the front surface 21 of the light guide plate 20, and the second lights Lg2, Lg4, and Lg6 may propagate to the rear surface 22 of the light guide plate 20. The second lights Lg2, Lg4, and Lg6 may not satisfy an angle for total reflection at the rear surface 22 of the light guide plate 20, and thus, may pass through the rear surface 22. From among the second lights Lg2, Lg4, and Lg6 that have passed through the rear surface 22 of the light guide plate 20, the second lights Lg2 and Lg4 emitted through a portion of the light guide plate 20 at which the green dichroic mirror 30G is not arranged, may be emitted to the outside, and the second light Lg6 emitted to a portion of the light guide plate 20 at which the green dichroic mirror 30G is arranged, may be reflected by the green dichroic mirror 30G to be re-incident to the light guide plate 20. The second light Lg6 reflected by the green dichroic mirror 30G to be re-incident to the light guide plate 20 may be emitted from the light guide plate 20 in the same direction as the first light Lg5 according to the principle of refraction and reflection of light.

FIG. 7B and FIG. 7C are cross-sectional views of the directional backlight unit 200 of FIG. 6, taken along a direction II-II'.

Referring to FIG. 7B and FIG. 7C, the red dichroic mirror 30R and the blue dichroic mirror 30B may be arranged only over a portion of the light guide plate 20. Also, the red dichroic mirror 30R may be arranged at the opposite side to the first light source 11, and the blue dichroic mirror 30B may be arranged at the opposite side to the third light source 13.

Referring to FIG. 7B, red light Lr emitted from the first light source 11 may be incident into the light guide plate 20. The incident red light Lr may be diffracted into first lights Lr1, Lr3, and Lr5 and second lights Lr2, Lr4, and Lr6 by the diffraction gratings 40, and the red light Lr may propagate into the light guide plate 20 via total reflection. First diffracted light of the red light Lr may be the first lights Lr1, Lr3, and Lr5, and negative first diffracted light may be the second lights Lr2, Lr4, and Lr6.

The first lights Lr1, Lr3, and Lr5 may be emitted in a predetermined direction by passing through the front surface 21 of the light guide plate 20, and the second lights Lr2, Lr4, and Lr6 may propagate to the rear surface 22 of the light guide plate 20. The second lights Lr2, Lr4, and Lr6 may not satisfy an angle for total reflection at the rear surface 22 of the light guide plate 20, and thus, may pass through the rear surface 22. From among the second lights Lr2, Lr4, and Lr6 that have passed through the rear surface 22 of the light guide plate 20, the second light Lr2 that is incident to the blue dichroic mirror 30B may be emitted to the outside by passing through the blue dichroic mirror 30B, the second light Lr4 emitted to a portion of the light guide plate 20 at which the red, green, and blue dichroic mirrors 30R, 30G, and 30B are not arranged, may be reflected to the outside, and the second light Lr6 emitted to a portion of the light guide plate 20 at which the red dichroic mirror 30R is arranged, may be reflected by the red dichroic mirror 30R to be re-incident to the light guide plate 20. The second light Lr6 that is reflected by the red dichroic mirror 30R to be re-incident to the light guide plate 20 may be emitted from the light guide plate 20 in the same direction as the first light Lr5 according to the principle of refraction and reflection of light.

Referring to FIG. 7C, blue light Lb emitted from the third light source 13 may be incident into the light guide plate 20. The incident blue light Lb may be diffracted into first lights Lb1, Lb3, and Lb5 and second lights Lb2, Lb4, and Lb6 by the diffraction gratings 40, and the blue light Lb may propagate into the light guide plate 20 via total reflection. First diffracted light of the blue light Lb may be the first lights Lb1, Lb3, and Lb5, and negative first diffracted light may be the second lights Lb2, Lb4, and Lb6.

The first lights Lb1, Lb3, and Lb5 may be emitted in a predetermined direction by passing through the front surface 21 of the light guide plate 20, and the second lights Lb2, Lb4, and Lb6 may propagate to the rear surface 22 of the light guide plate 20. The second lights Lb2, Lb4, and Lb6 may not satisfy an angle for total reflection at the rear surface 22 of the light guide plate 20, and thus, may pass through the rear surface 22. From among the second lights Lb2, Lb4, and Lb6 that have passed through the rear surface 22 of the light guide plate 20, the second light Lb2 that is incident to the red dichroic mirror 30R may be emitted to the outside by passing through the red dichroic mirror 30R, the second light Lb4 emitted to a portion of the light guide plate 20 at which the red, green, and blue dichroic mirrors 30R, 30G, and 30B are not arranged, may be reflected to the outside, and the second light Lb6 emitted to a portion of the light guide plate 20 at which the blue dichroic mirror 30B is arranged, may be reflected by the blue dichroic mirror 30B to be re-incident to the light guide plate 20. The second light Lb6 that is reflected by the blue dichroic mirror 30B to be re-incident to the light guide plate 20 may be emitted from the light guide plate 20 in the same direction as the first light Lb5 according to the principle of refraction and reflection of light.

According to the directional backlight unit 200 according to an example embodiment, the red dichroic mirror 30R may be arranged at a rear end of the light propagation direction of the red light, that is, at the opposite side to the red light source, the green dichroic mirror 30G may be arranged at a rear end of the light propagation direction of the green light, that is, at the opposite side to the green light source, and the blue dichroic mirror 30B may be arranged at a rear end of the light propagation direction of the blue light, that is, at the opposite side to the blue light source, and thus, uniformity of the light emitted from the directional backlight unit 200 may be increased.

FIG. 8 is a perspective view of an image display apparatus 500 according to an example embodiment.

Referring to FIG. 8, the image display apparatus 500 may include a directional backlight unit 550 and a display panel 530.

The display panel 530 may display a 3D image by modulating light emitted from the directional backlight unit 550 based on 3D image information. The display panel 530 may include a color filter layer 510 and a light modulation layer 520.

The color filter layer 510 may include a plurality of two-dimensionally arranged color filters via which light of different wavelength ranges pass through, the color filters being alternately and repetitively arranged.

The light modulation layer 520 may include a plurality of light modulation areas respectively corresponding to the plurality of color filters arranged in the color filter layer 510. The plurality of light modulation areas may be separately controlled by image information.

The arrangement of the light modulation layer 520 and the color filter layer 510 is not limited to the illustration of FIG. 8, and may vary.

FIG. 8 illustrates only the color filter layer 510 and the light modulation layer 520 included in the display panel 530. However, the display panel 530 may also include a pixel electrode, a common electrode, a thin film transistor (TFT) array layer, etc., for driving each light modulation area, and may include an optical film, such as a polarization plate, etc.

The directional backlight unit 550 may be any one of the directional backlight units 100, 110, 120, 130, and 200 according to the example embodiments described above. The light emitted by the diffraction gratings arranged at a surface of the light guide plate may be incident into an appropriate pixel of the display panel 530. In each of the light modulation areas of the light modulation layer 520 of the display panel 530, the incident light from the direction backlight unit 550 may be modulated in accordance with its directivity and color to display a 3D image.

The image display apparatus 500 according to an example embodiment may display a plurality of views based on the diffraction gratings arranged in the directional backlight unit 550. Here, the view may indicate an image that is shown to one eye of a viewer. However, example embodiments are not limited thereto, and two or more view images may be shown to one eye of the viewer.

According to the one or more of the above example embodiments, the directional backlight units 100, 110, 120, 130, and 200, and the image display apparatus 500 may reflect light passing through the rear surface 22 of the light guide plate 200 due to the light being reflected by the mirror 30 or 33 arranged at the rear surface 22 of the light guide plate 200, and may re-use the light, and thus, may have improved light output efficiency.

Also, the mirror 30 or 33 may be arranged only over a portion of the light guide plate 20, and thus, uniformity of the light emitted from the directional backlight units 100, 110, 120, 130, and 200 may be increased.

It should be understood that example embodiments described herein should be considered in a descriptive sense only and not for purposes of limitation.

While example embodiments have been described with reference to the drawings, it will be understood by those of ordinary skill in the art that various changes in form and details may be made therein without departing from the spirit and scope as defined by the following claims and their equivalents.

What is claimed is:

1. A directional backlight unit comprising:
   at least one light source;
   a light guide plate arranged at a side of the at least one light source, and configured to guide light emitted from the at least one light source by total reflection;
   a plurality of diffraction gratings arranged in a pattern at a surface of the light guide plate and configured to diffract the light emitted from the at least one light source and to emit the light diffracted by the plurality of diffraction gratings at a predetermined angle from a front surface of the light guide plate; and
   a mirror arranged at a rear surface of the light guide plate and configured to reflect the light diffracted by the plurality of diffraction gratings toward the light guide plate, the rear surface of the light guide plate being opposite to the front surface of the light guide plate,
   wherein the at least one light source comprises at least one of a red light source, a green light source, and a blue light source,
   wherein the mirror comprises at least one of a red dichroic mirror configured to reflect only red light, a green dichroic mirror configured to reflect only green light, and a blue dichroic mirror configured to reflect only blue light, and
   wherein the at least one of the red dichroic mirror, the green dichroic mirror and the blue dichroic mirror is arranged over a portion of the rear surface of the light guide plate.

2. The directional backlight unit of claim 1, wherein the plurality of diffraction gratings are arranged at the front surface of the light guide plate.

3. The directional backlight unit of claim 1, wherein the plurality of diffraction gratings are arranged at the rear surface of the light guide plate.

4. The directional backlight unit of claim 1, wherein the mirror is arranged over a total area of the rear surface of the light guide plate.

5. The directional backlight unit of claim 1, wherein the mirror is arranged over a portion of the rear surface of the light guide plate.

6. The directional backlight unit of claim 1, wherein the red dichroic mirror is arranged at a side of the rear surface of the light guide plate opposite to the red light source, the green dichroic mirror is arranged at a side of the rear surface of the light guide plate opposite to the green light source, and the blue dichroic mirror is arranged at a side of the rear surface of the light guide plate opposite to the blue light source.

7. An image display apparatus comprising:
   at least one light source;
   a light guide plate arranged at a side of the at least one light source, and configured to guide light emitted from the at least one light source by total reflection;
   a plurality of diffraction gratings arranged in a pattern at a surface of the light guide plate and configured to diffract the light emitted from the at least one light source and to emit the light diffracted by the plurality of diffraction gratings at a predetermined angle from a front surface of the light guide plate;
   a mirror arranged at a rear surface of the light guide plate and configured to reflect the light diffracted by the plurality of diffraction gratings toward the light guide plate, the rear surface of the light guide plate being opposite to the front surface of the light guide plate; and
   a display panel arranged on the front surface of the light guide plate,
   wherein the at least one light source comprises at least one of a red light source, a green light source, and a blue light source,
   wherein the mirror comprises at least one of a red dichroic mirror configured to reflect only red light, a green dichroic mirror configured to reflect only green light, and a blue dichroic mirror configured to reflect only blue light, and
   wherein the at least one of the red dichroic mirror, the green dichroic mirror and the blue dichroic mirror is arranged over a portion of the rear surface of the light guide plate.

8. The image display apparatus of claim 7, wherein the plurality of diffraction gratings are arranged at the front surface of the light guide plate.

9. The image display apparatus of claim 7, wherein the plurality of diffraction gratings are arranged at the rear surface of the light guide plate.

10. The image display apparatus of claim 7, wherein the mirror is arranged over a total area of the rear surface of the light guide plate.

11. The image display apparatus of claim 7, wherein the mirror is arranged over a portion of the rear surface of the light guide plate.

12. The image display apparatus of claim 7, wherein the red dichroic mirror is arranged at a side of the rear surface of the light guide plate opposite to the red light source, the green dichroic mirror is arranged at a side of the rear surface of the light guide plate opposite to the green light source, and the blue dichroic mirror is arranged at a side of the rear surface of the light guide plate opposite to the blue light source.

* * * * *